United States Patent [19]

Shoji et al.

[11] Patent Number: 5,000,303
[45] Date of Patent: Mar. 19, 1991

[54] ONE-WAY CLUTCH

[75] Inventors: Masao Shoji, Fujisawa; Yoshio Kinoshita, Ayase; Norio Komatsubara, Fujisawa, all of Japan

[73] Assignee: NSK Warner K.K., Tokyo, Japan

[21] Appl. No.: 470,400

[22] Filed: Jan. 26, 1990

Related U.S. Application Data

[63] Continuation of Ser. No. 365,684, Jun. 14, 1989, abandoned.

[30] Foreign Application Priority Data

Jun. 16, 1988 [JP] Japan ............................ 63-78845[U]

[51] Int. Cl.$^5$ .............................................. F14D 41/07
[52] U.S. Cl. .................................... 192/45.1; 188/82.8
[58] Field of Search ............................ 192/45.1, 41 A; 188/82.8

[56] References Cited

U.S. PATENT DOCUMENTS

| 2,824,636 | 2/1958 | Troendly et al. | 192/45.1 |
| 2,832,450 | 4/1958 | Wade | 192/45.1 |
| 2,856,045 | 10/1958 | Ferris | 192/45.1 |
| 2,940,567 | 6/1960 | Dodge | 192/45.1 |
| 4,619,352 | 10/1986 | Shoji et al. | 192/41 A |
| 4,635,770 | 1/1987 | Shoji et al. | 192/41 A |

FOREIGN PATENT DOCUMENTS

| 53-122049 | 10/1978 | Japan . | |
| 54-109557 | 8/1979 | Japan . | |
| 56-47418 | 11/1981 | Japan . | |
| 57-37775 | 8/1982 | Japan . | |
| 1018816 | 2/1966 | United Kingdom | 192/45.1 |
| 2061418 | 5/1981 | United Kingdom | 192/41 A |

Primary Examiner—Rodney H. Bonck
Assistant Examiner—Andrea Pitts
Attorney, Agent, or Firm—Shapiro and Shapiro

[57] ABSTRACT

A one-way clutch comprises an outer race where inner surface is formed with a raceway surface and an annular groove; an inner race whose outer surface is formed with a raceway surface; a plurality of wedge members interposed between the outer and inner races about the annular space defined therebetween; and a retainer comprising an outwardly extended annular projected portion engageable with the annular groove and a pushing member for causing the annular projected portion to elastically press against the annular groove. The retainer member is interposed between the outer and inner races so as to retain the plurality of wedge members, the outer race is provided with a stopper for limiting the displacement of the projected portion after the engagement thereof with the annular grove. The outer diameter of the projected portion is greater than the inner diameter of the raceway surface of the outer race.

5 Claims, 5 Drawing Sheets

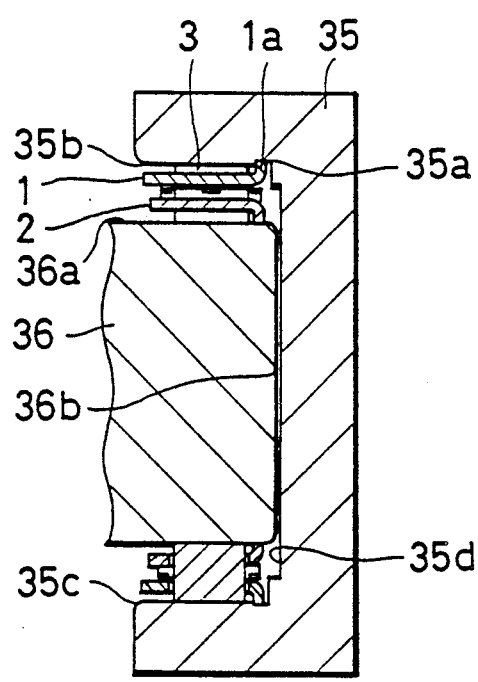
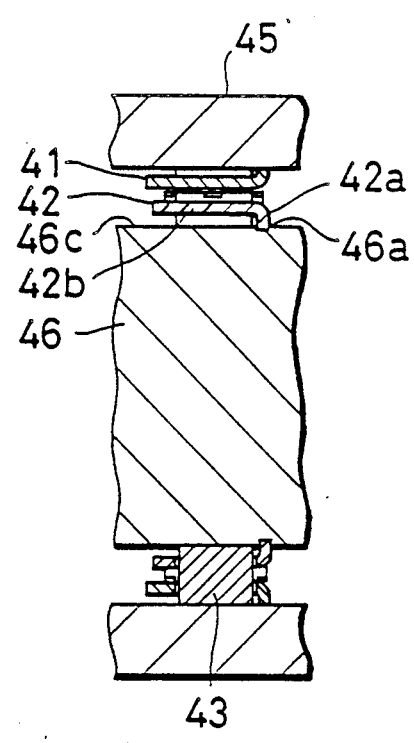
FIG.3
FIG.4

FIG. 9B  FIG. 9A  FIG. 9C
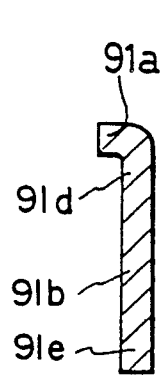
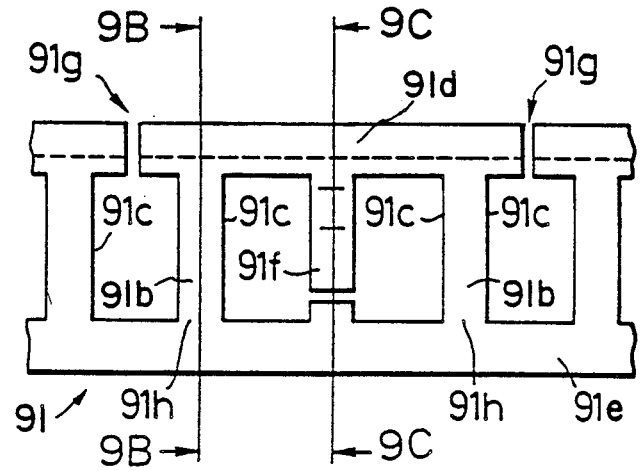
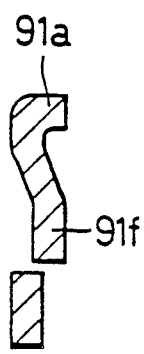
FIG. 10
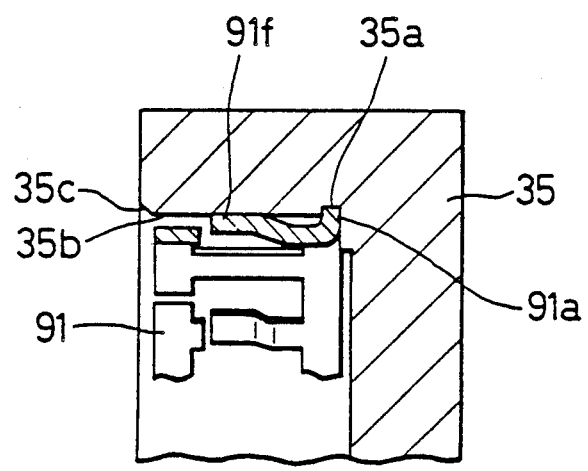

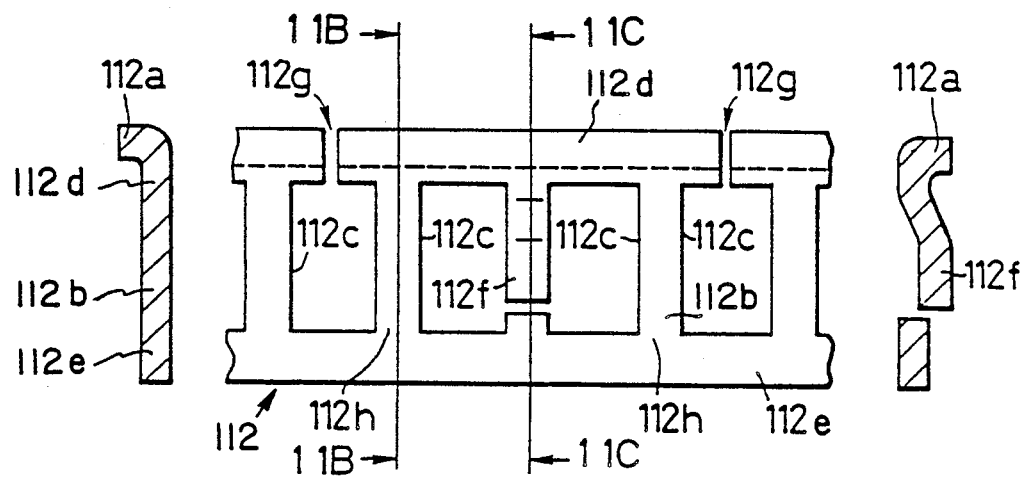
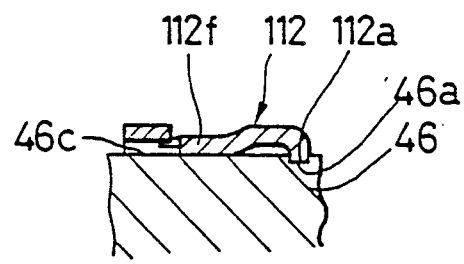

ONE-WAY CLUTCH

This is a continuation of application Ser. No. 365,684 filed June 14, 1989, now abandoned.

BACKGROUND OF THE INVENTION

1. Field of the Invention

The present invention relates to a one-way clutch used in a power transmission system in an automative vehicle or the like for the purpose of one-way torque transmission, prevention of a reverse rotation and the like, and more particularly relates to a retainer used in such a one-way clutch of the type described above.

2. Related Background Art

A one-way clutch is disposed between an inner race or driving race and an outer race or driven race so that when the driving race rotates in a predetermined direction, it transmits driving torque to the driven race, but when the direction of rotation of the driving race is opposite to the predetermined direction no driving torque is transmitted to the driven race.

Generally, one-way clutches may be divided into two types, a sprag type and a roller type.

A sprag type one-way clutch comprises an outer race having an annular inner surface, an inner race having an outer peripheral surface which is in coaxial and opposing relationship with the inner surface of the outer race and a plurality of sprags or wedges disposed in an annular space defined between the inner surface of the outer race and the outer surface of the inner race. When the inner race rotates in one direction, its upper and lower cam surfaces are inclined to positions at which no driving torque is transmitted and the relative movement between the inner and outer races is permitted. On the other hand, when the inner race is rotated in the opposite direction, the cam surface of each sprag is displaced so that the sprags are caused to rise and prevent the relative movement between the outer and inner races. Consequently, the driving torque is transmitted from the inner race to the outer race. The one-way clutch of the type described above is disclosed in, for instance, Japanese Patent Laid-Open No. 54-109557 (1979).

A common problem of older one-way clutches is that they have no facility for positioning in the axial direction in single one-way clutch assemblies. It follows therefore than when such a one-way clutch is mounted, a device capable of preventing the displacement in the axial direction of the one-way clutch must be mounted. A locating snap ring as shown in FIG. 7 and a retaining plate as shown in FIG. 8 are examples of devices for preventing the displacement in the axial direction of one-way clutches.

FIG. 7 is a sectional view of a conventional sprag type one-way clutch taken in the direction perpendicular to the axis thereof. An outer retainer 71 is in the form of a cylinder and is formed with 16 outer slots about a periphery thereof. An inner retainer 72 is also in the form of a cylinder smaller in diameter than the outer retainer 71, and is fitted into the outer retainer 71 coaxially thereof. Furthermore the inner retainer 72 is formed with a plurality of inner slots which are equal in number to the outer slots of the outer retainer 71 in radially opposing relationship with the outer slots of the outer retainer 71 and which are substantially similar in shape to the outer slots.

Sprags 73 (each in the form of a gourd when viewed from the axial direction of the retainer) are extended through the outer and inner slots, and the upper surface of each sprag 73 is arranged to contact with the inner peripheral surface of the outer race 75 while the lower surface thereof is arranged to contact with the outer peripheral surface of the inner race 76.

The inner peripheral surface of the outer race 75 is formed with an annular or circular groove 75a into which is fitted a locating snap ring 77. The ring 77 is thin and in the form of a ring whose peripheral part is partially cut off and is made of a spring material. The ends of the cut-off part are pressed against each other so that the diameter of the ring 77 is decreased when the ring 71 is fitted into the annular groove 75a. After being fitted into the annular groove 75a, the ring 75 springs back to its original diameter, and is pressed against the inner peripheral side surfaces and the bottom of the annular groove 75a.

When the outer retainer 71 is displaced in the axial direction, it engages with the locating snap ring 77 so that the further displacement of the outer retainer 71 is stopped. Thus the locating snap ring 77 functions as a stopper. As a result, the displacement of the sprags 73 and the inner retainer 72 can be prevented.

FIG. 8 is a sectional view of a conventional sprag type one-way clutch equipped with another means for preventing the displacement in the axial direction of the outer retainer, taken in the direction perpendicular to the axis of the one-way clutch. An outer retainer 81 is in the form of a cylinder and is formed with 16 outer slots about a periphery thereof. An inner retainer 82 is also in the form of a cylinder which is smaller in diameter than the outer retainer 81 and is fitted into the outer retainer 81 coaxially thereof. Furthermore, the inner retainer 82 is formed with a plurality of inner slots which are equal in number to the outer slots of the outer retainer 81 and substantially similar in shape to the outer slots. Sprags 83 (each in the form of a gourd when viewed from the axial direction of the retainer) are extended through the outer and inner slots. The upper surface of each sprag 83 is arranged to contact with the inner peripheral surface of the outer race 85 while the lower surface thereof is arranged to contact with the outer peripheral surface of the inner race 86.

A retaining platt 87 is attached to the open end of the outer race 85. The retaining plate 87 is thin and is similar in shape to the locating snap ring 77 shown in FIG. 7, but its outer peripheral portion has a caulked portion 87a caulked to the outer peripheral surface of the outer race 85, whereby the retaining plate 87 is securely attached to the outer race 85.

Like the locating snap ring 77 shown in FIG. 7, the retaining plate 87 engages with the outer retainer 81 when the latter is displaced axially and outwardly so that the retaining plate 87 also functions as a stopper. Therefore the displacement of the sprags 83 and the inner retainer 82 can be also prevented. However, in order to mount the locating snap ring or the retaining plate on the outer race, it is necessary that a space required for mounting the ring or plate must be previously selected on the outer race and its surrounding portion. Another problem is that since the locating snap rings or the retaining plates must be fabricated independently of the outer race, the overall fabrication costs are increased.

Furthermore, in the conventional one-way clutch of the type in which the inner race when and its retainer race, the rotational speed of the outer race varies suddenly, the sprags may temporarily slide relative to the raceway surface of the outer race due to force of inertia. This sliding of the sprags causes excessive wear of the raceway surface of the outer race and excessive wear of the sprags, so that the operating life of the one-way clutch is shortened. In order to prevent this effect, the outer retainer is, for formed with projections called drag pieces which in turn are forcibly made to contact with the outer race to produce strong frictional force.

In the case of the one-way clutch of the type described above, the design is such that in the case of idling or transmitting no torque, the race and sprags slide with respect to one another so that upon a change of the rotational input, a frictional force is directly exerted to each sprag, thereby changing its posture. With the above-described construction, some sprags are subjected to excessive wear. In addition, the posture change of all the sprags does not occur concurrently, in response to a sudden variation of the input. Therefore in order to concurrently and quickly change the positions of the sprags in response to a sudden variation in rotation input to the one-way clutch, and furthermore to prevent excessive wear of the sprags, projections called drag strips are projected from the inner race so as to produce weak friction between the inner race and the inner retainer, whereby the inner retainer can follow the variations in rotation of the inner race.

Furthermore, in the conventional one-way clutches, the inclination of the retainer with respect to the outer and inner races (that is, a misalignment between the retainer on one hand and the outer and inner races on the other hand) causes a malfunction of the clutch. In order to solve this problem at both sides of the retainer, ring-shaped portions which are equal in diameter to, for instance, the inner diameter of the outer race or the outer diameter of the inner race, must be provided.

SUMMARY OF THE INVENTION

In view of the above, an object of the present invention is to provide a one-way clutch which may be produced at less cost and which nonetheless exhibits excellent performance.

Another object of the present invention is to prevent displacement in the axial direction of a one-way clutch by the engagement between a projection of an outer retainer and a recess of an outer race, and furthermore to prevent inclination of the retainer by rotating the outer race and the outer retainer substantially in unison.

Another object of the present invention is to prevent displacement in the axial direction of a one-way clutch by the engagement between a projection of an inner retainer and a recess of an inner race, and furthermore to prevent inclination of the retainer by producing a predetermined degree of frictional force between the inner race and the inner retainer.

BRIEF DESCRIPTION OF THE DRAWINGS

FIG. 3 is an axial sectional view when the first embodiment shown in FIG. 1 is mounted between an outer race and an inner race;

FIG. 4 is an axial sectional view of a second preferred embodiment of a one-way clutch in accordance with the present invention mounted between an outer race and an inner race;

FIG. 9A is a partial development of an outer retainer of another embodiment;

FIG. 9B is a cross-sectional view of the retainer shown in FIG. 9A, taken along line 9B—9B;

FIG. 9C is a cross-sectional view of the retainer shown in FIG. 9A, taken along line 9C—9C;

FIG. 10 is a partial cross-sectional view showing the retainer shown in FIG. 9A, incorporated into an outer race;

FIG. 11A is a partial development of an inner retainer of another embodiment;

FIG. 11B is a cross-sectional view of the retainer shown in FIG. 11A, taken along line 11B—11B;

FIG. 11C is a cross-sectional view of the retainer shown in FIG. 11A, taken along line 11C—11C;

FIG. 12 is a partial cross-sectional view showing the retainer shown in FIG. 11A, assembled with an inner race.

DESCRIPTION OF THE PREFERRED EMBODIMENTS

Figure 1:
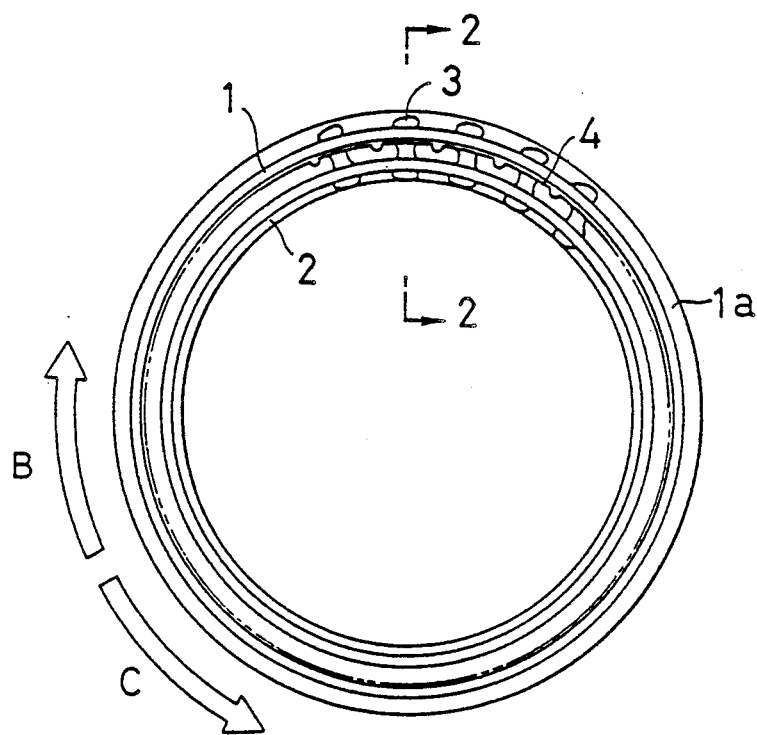
FIG. 1 is a front view of a first embodiment of a one-way clutch in accordance with the present invention assembled with an outer retainer 1, an inner retainer 2, sprags 3 and a ribbon spring 4 and viewed in the axial direction of the one-way clutch thus assembled.
Figure 2:
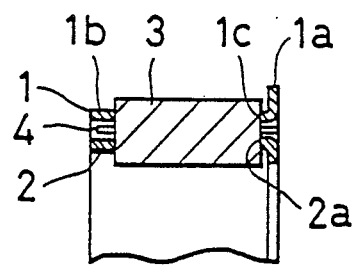
FIG. 2 is a sectional view taken along the line 2—2 of FIG. 1.

FIG. 1 is a front view of a first embodiment of a one-way clutch in accordance with the present invention assembled with an outer retainer 1, an inner retainer 2, sprags 3 and a ribbon spring 4 and viewed in the axial direction of the one-way clutch thus assembled. The outer retainer 1 comprises a cylindrical portion 1b extended in the axial direction and a thin annular shaped portion 1a whose inner end is connected to one end of the cylindrical portion 1b. The cylindrical portion 1b and the thin annular portion 1a are made of a material which can be elastically deformed. Within the outer retainer 1, the inner retainer 2 in the form of a cylinder is disposed coaxially of the outer retainer 1. Both of the outer and inner retainers are formed with radial openings about their circumferences. The radial openings of each retainer are spaced apart from each other by a predetermined distance, have the same shape, and are in opposing relationship with corresponding openings of the other retainer. In the first embodiment, 24 slots (openings) 1c and 2a both in the form of a rectangle are defined as shown in FIG. 2. A sprag 3 is extended through the rectangular slot 1c and the rectangular slot 2a which is closest to the slot 1c. It must be pointed out here that in FIG. 1, only five sprags 3 are shown, but actually the sprags are equal in number to the number of pairs of opposed slots 1c, 2a.

Each sprag 3 has a section substantially in the form of a gourd in the axial direction and a length slightly longer than the difference between the inner radius of the outer race and the outer radius of the inner race. It follows therefore that each sprag 3 mounted as to be slightly inclined, and this inclination of each sprag 3 plays a very important role in the mode of operation of the first embodiment to be described hereinafter. The ribbon spring 4 surrounds the whole circumference in such a way that the adjacent sprags 3 are interconnected and biases all the sprags 3 in such a way the upper surfaces or lower surfaces of the sprags 3 are normally urged into contact with the peripheral surface of the outer or inner race (not shown) in FIG. 1.

Referring still to FIG. 1, the general mode of operation of a one-way clutch incorporating a retainer in accordance with the present invention will now be described.

In FIG. 1, a driving race is an outer race (not shown) while a driven race is an inner race (not shown). When the outer race is rotated in the direction indicated by an arrow C; that is, in the counterclockwise direction, the upper and lower surfaces of each sprag are subjected to sliding contact with the inner surface of the outer race and the outer surface of the inner race, respectively, thereby producing frictional force which in turn is exerted on each sprag 3 in the direction in which each sprag 3 is caused to incline. In this case, due to the difference between the diameters of the raceway surface, the sprags 3 slip and do not transmit the rotating force to the inner race. Thus, the inner race does not rotate in unison with the outer race. On the other hand, when the outer race is rotated in the direction indicated by an arrow B in FIG. 1, that is, in the clockwise direction, the upper and lower surfaces of each sprag 3 are subjected to sliding contact with the inner surface of the outer race and the outer surface of the inner race, respectively, again producing a frictional force. In this case, however, the frictional force is exerted on each sprag 3 in the direction in which the sprag 3 is forced to stand upright so that it is caught between the outer and inner races and effects a so-called wedging action. The stronger the above-mentioned frictional force, the higher the strength of the wedging action becomes. As a result, the frictional force is further increased and the outer race and the inner race become integral through the sprags 3 so that the rotating force of the outer race is transmitted to the inner race.

FIG. 2 is a sectional view taken along the line 2—2 of the assembly shown in FIG. 1. In FIG. 2, the annular portion 1a of the outer retainer is extended beyond the upper surfaces of the sprags 3 radially outwardly. The length of the rectangular slots 1c and 2a in the axial direction of the assembly is slightly greater than corresponding dimension of the sprags, so that in the case of the operation of the one-way clutch, each sprag 3 can move suitably relative to the rectangular slots 1c and 2a.

FIG. 3 is an axial sectional view showing the assembly of FIG. 1 interposed between outer and inner races of a one-way clutch in accordance with the invention. The same reference numerals are used to designate similar parts in FIGS. 1 and 3.

The outer race 35 has a recess or blind hole 35d which in turn has an inner surface 35b. The lowermost (rightmost in FIG. 3); part of the inner surface 35b is formed with an annular groove 35a to provide a relief groove or a work clearance groove which is required when the inner surface 35b is ground and polished. The inner surface 35b is in contact with the outer surfaces of the sprags 3.

The annular portion 1a of the outer retainer 1 is fitted into annular groove 35a, whereby the outer retainer 1 is mounted on the outer race 35. The outer diameter of the annular portion 1a is greater than the inner diameter of the inner surface 35b which is a raceway surface of the outer race 35 and is slightly greater than the inner diameter of the annular groove 35a. As will be described in more detail hereinafter with reference to FIG. 5, outer retainer 1 is formed with an open notch which can be closed to accommodate inward deformation of annular portion 1a to an outer diameter smaller than the inner diameter of the blind hole 35d, whereby the annular portion 1a can be fitted into the annular inner groove 35a. Even when the annular portion 1a is fitted into the annular inner groove 35a, the outer retainer 1 does not fully restore to its original shape. Rather, it remains somewhat deformed and thus exerts strong pressure on the outer race. Furthermore, the thickness in the axial direction of the annular portion 1a is substantially equal to the width of the annular groove 35a. The edge of the open end of the blind hole 35d is beveled as indicated by 35c so as to facilitate the insertion of the annular portion 1a into the blind hole 35d. The inner race 36 is fitted into the blind hole 35d in such a way that the outer peripheral surface contacts with the inner surfaces of the sprags 3 and the axial end 36b is spaced apart from the base of the blind hole 35d by a small distance so that the outer and inner races 35 and 36 can freely rotate independently of each other without any interference. Since annular portion 1a of the outer retainer 1 is fitted into the inner annular groove 35a of the outer race 35 as described above, displacement in the axial direction of the one-way clutch can be prevented. Moreover since the annular portion 1a exerts strong force on the annular groove 35a, a strong frictional force is produced between the outer race 35 and the outer retainer 1 so that they are always rotated in unison. As a result, wear of the outer race 35 and the sprags 3 in contact therewith can be prevented. Furthermore, inclination of the retainer can be prevented by the engagement between the annular portion 1a and the inner annular groove 35a.

FIG. 4 is an axial sectional view of a second preferred embodiment of a one-way clutch in accordance with the present invention.

The inner surfaces of sprags 43 are in contact with the outer peripheral surface 46c of an inner race 46, which is a raceway surface and formed with an outer annular groove 46a in the vicinity of the sprags 43. An inner retainer 42 comprises a cylindrical portion 42b and a thin annular portion 42a integrally connected to one end of the cylindrical portion. The annular portion 42a is fitted into the outer annular groove 46a. The inner diameter of the annular portion 42a is smaller than the outer peripheral surface 46c of the inner race 46 and is slightly smaller than the inner diameter of the outer annular groove 46a. As will be described in detail shortly with reference to FIG. 6 the inner retainer 42 is is provided with a notch which opens to accommodate outward deformation of annular portion 42a, so that retainer 42 may be fitted over the outer peripheral surface 46c and annular portion 42a brought into engagement with the outer annular groove 46a. Because of the construction of the type described above, when the annular portion 42a is fitted into the outer annular groove 46a, the annular portion 42a exerts a relatively low pressure (caused by the deformation of the inner retainer 42) on to the outer annular groove 46a. The thickness in the axial direction of the annular portion 42a is substantially equal to the width of the outer annular groove 46a.

The outer surfaces of the sprags 43 are in contact with the outer race 45, and the sprags 43 are retained by the outer retainer 45.

As described above, the annular portion 42a of the inner retainer is in engagement with the outer annular groove of the inner race and thus displacement in the axial direction of the one-way clutch can be prevented.

The annular portion 42a exerts a relatively low pressure on the outer annular groove 46a so that the frictional force produced between the annular portion 42a and the outer annular groove 46a is weaker than the frictional force produced between the outer race and the outer retainer.

Figure 5:
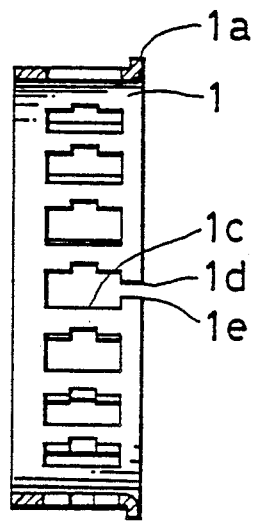
FIG. 5 is a sectional view of the outer retainer 1 of the first embodiment shown in FIG. 1.

FIG. 5 is a sectional view of the outer retainer 1 of the first embodiment shown in FIGS. 1, 2 and 3. FIG. 5, it is understood that a notch is cut from through annular portion 1a into one slot 1c so that the outer retainer 1 has two ends 1d and 1e. When the outer retainer 1 is inserted into the outer race, the ends 1d and 1e of the outer retainer move toward each other due to the deformation of the outer retainer 1 and in some cases they contact each other. Because of the notch, the stresses produced in response to the deformation of the outer retainer 1 can be decreased so that the outer retainer 1 can be deformed by small force. Therefore, materials which have a relatively high degree of rigidity can be used as materials of the retainers of a one-way clutch in accordance with the present invention.

Figure 6:
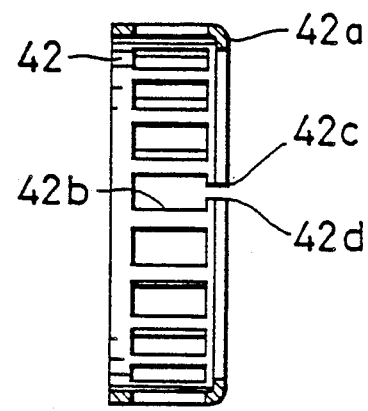
FIG. 6 is a sectional view of an inner retainer 42 of the second preferred embodiment shown in FIG. 4.
Figure 7:
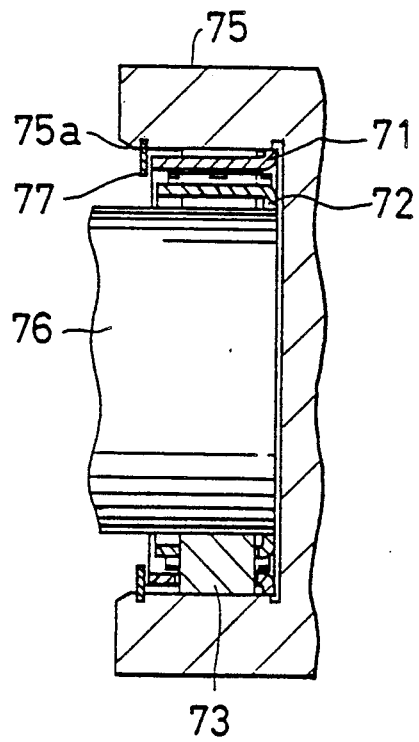
FIG. 7 is a sectional view of a conventional sprag type one-way clutch, viewed in a direction perpendicular to the axis thereof.
Figure 8:
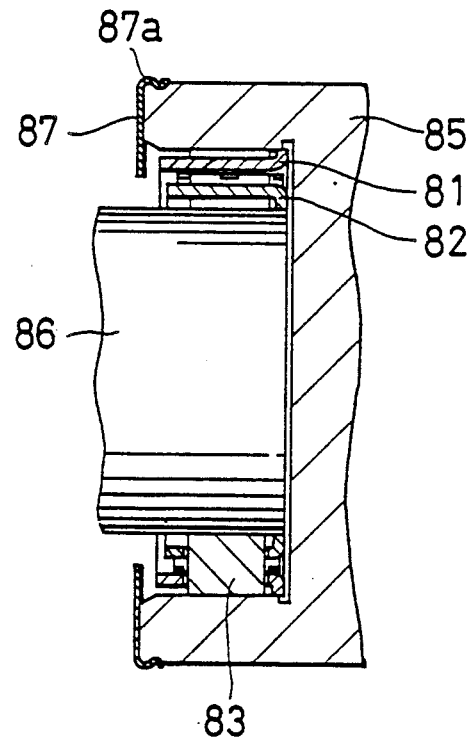
FIG. 8 is a sectional view of another conventional sprag type one-way clutch with means for preventing the displacement in the axial direction, again viewed in a direction perpendicular to the axis of the one-way clutch.

FIG. 6 is a sectional view of the inner retainer 42 of the second embodiment shown in FIG. 4. In the FIG. 6 retainer, a notch is cut through annular portion 42a so that the ends 42c and 42d of the inner retainer 42 are formed. These ends move away from each other when the inner retainer is outwardly deformed for insertion onto the inner race.

So far two embodiments of a one-way clutch in accordance with the present invention have been described in detail with reference to the accompanying drawings, but it is to be understood that the present invention is not limited to the embodiments described above and that various modifications and improvements can be made within the scope of the present invention. For instance, frictional force between the projected portion of the retainer and the recessed portion formed in the outer or inner race is not limited to frictional force produced by the contact between the top (outer periphery) of the projected portion and the base of the recessed portion. More particularly, the width in the axial direction of the projected portion and the width in the axial direction of the recessed portion may be suitably selected that frictional force is produced by the contact between the sides of the projected and recessed portions. Furthermore, so far only one pair of projected and recessed portions have been described, but it is to be understood that two or more pairs may be provided as long as the free surfaces are available.

In a one-way clutch in accordance with the present invention, the displacement in the axial direction of the one-way clutch can be prevented by the engagement between a projected portion of an outer retainer and a recessed portion of an outer race and furthermore the outer race rotates substantially in unison with the outer retainer so that the inclination of the retainer can be prevented.

Furthermore, in a one-way clutch in accordance with the present invention, the displacement in the axial direction thereof can be prevented by the engagement of a projected portion of an inner retainer and a recessed portion of an inner race so that a predetermined degree of frictional force is produced and the inclination of the retainer can be prevented.

An outer retainer of another embodiment is explained below with reference with FIGS. 9A, 9B, 9C and 10.

FIG. 9A is a partial developement of an outer retainer 91 when as viewed radially outwardly from inside thereof. The outer retainer 91c has rectangular slots 91 and notches 91g similar to those of the FIG. 5 embodiment. An explanation of the functions thereof is therefore omitted here.

The outer retainer 91 also has portions 91f which are obtained by cutting so called poles or pillars 91b (I-bar) between adjacent slots 91c and twice folding the poles outwardly as shown in FIG. 9C. A pole which is not cut is also seen in FIG. 9B, together with annular axial end portions 91d, 91e of the retainer.

There are preferably a plurality of folded portion 91f provided at regular intervals. However, there may be as few as one such folded portion 91f. The folded portions 91f are projected to the same level of the annular portion 91a. Moreover, one folded portion 91f is provided at a pole between two slots 91c which are between two adjacent slots 91c in which the notches 91g are respectively provided.

In FIG. 10, only the outer race 35 and the outer retainer 91 are shown for easy understanding. The outer retainer 91 is inserted and fitted into the outer race 35 which is the same as that shown in FIG. 3. The annular portion 91a of the outer retainer 91 is engaged with the annular inner groove 35a of the outer race 35. Furthermore, the folded portions 91f of the outer retainer 91 abut the inner surface 35b.

A function and an advantage of the outer retainer 91 having the folded portions 91f are explained as follows.

First, when the outer retainer 91 integrated with the sprags, the inner retainer, etc., is incorporated into the outer race 35, the outer retainer 91 cannot be inserted into the outer race 35 in the wrong direction, because there would be an interfering abutment of the folded portions 91f against the end face 35c. The outer retainer 91 can be completely inserted into the outer race 35, only if the annular portion 91a is firstly inserted thereinto prior to the retainer body, whereby improper assembly is prevented.

Next, while the outer retainer 91 is incorporated into the outer race 35, both the annular portion 91a and the folded portions 91f of the outer retainer 91 abut the inner surface of the outer race 35, whereby an inclination of the outer retainer 91 is more effectively prevented.

By the way, in one type of a one-way clutch, an elastic member is provided between the outer race and inner race for preventing a following movement. In this case, each retainer receives an inward force or an outward force from the elastic member, and deformation of the retainers can result. The provision of a notch or the like on the retainer causes the retainer to deform even more easily, whereby inclinations of the sprags are not uniform. In order to solve the above problem, it is necessary to use many elastic members having strong elastic forces for obtaining a small deformation of the retainers.

In the retainer having the folded portions and the notches of the present embodiment, the folded portions 91f disposed at regular intervals uniformly abut the inner surface of the outer race 35, and deform a part of the retainer in the vicinity of the folded portions 91f.

However, the notches provided at the both sides of the folded portions can absorb the deformation. Therefore, a deformation of other part of the retainer far from the notches becomes small, and a reduction of an abutting area of the retainer against the outer race can be minimized.

In addition, in a prior art retainer having no notch, a stress is concentrated at the folded portion 91f. However, if the notch 91g is provided in the vicinity of the folded portion 91f, the portion of the retainer in the vicinity of the folded portion 91f becomes easy to be torsionally deformed. Thus the concentration of the stress can be reduced. Furthermore, the stress absorption characteristics in a retainer can be freely set by adequately deciding dimensions and shapes of the notch 91g and portion 91h.

Another embodiment is shown in FIGS. 11A, 11B, 11C and 12. FIG. 11A is a partial development of an inner retainer 112 when radially inwardly viewed from outside thereof. The structure of the inner retainer 112 is substantially the same as that of the outer retainer 91, except for an annular portion 112a and a folded portion 112f projecting inwardly. In FIG. 12, the inner retainer 112 is attached to the inner race 46 with the annular portion 112a engaging the annular groove 46a. A function and an advantage of the inner retainer 112 are the same as those of the outer retainer 91 mentioned above, and an explanation thereof is omitted.

We claim:

1. A one-way clutch, comprising:
   an outer race having an inner circumferential raceway surface,
   an inner race having an outer circumferential raceway surface,
   a plurality of wedge members interposed between said raceway surfaces of said outer and inner races, and outer and inner annular retaining members interposed between said outer and inner races and retaining said wedge members,
   one of said retaining members including a pair of spaced annular end portions and a plurality of pillar members intermediate said end portions and defining together with said end portions a plurality of circumferentially spaced slots in said one retaining member,
   at least one of said pillar members having a portion projecting from one of said end portions into resilient abutment with one of said races,
   said one of said end portions having notch means including a notch cut through the full axial extent of said one end portion into a said slot near said one pillar member for facilitating deformation of a region of said one end portion near said one pillar member and thereby reducing stress concentration in said one pillar member.

2. A one-way clutch according to claim 1, wherein said one race has a circumferential groove formed therein and said one end portion has substantially radially projecting flange means engaged in said groove for preventing axial displacement of said retaining member and for cooperating with said one race jointly with said projecting portion of said one pillar member to prevent tilting of said one retaining member.

3. A one-way clutch according to claim 1, wherein said notch means includes a pair of said notches, and wherein between each pair of pillar members that is circumferentially adjacent to said one pillar member a respective one of said pair of notches is formed.

4. A retainer for a one-way clutch, comprising an annular body having a pair of annular axial end portions and a plurality of pillar members intermediate said end portions and defining together with said end portions a plurality of circumferentially spaced slots, at least one of said pillar members having projecting means bent radially of said body for abutting a raceway surface to which said body is to be fitted, one of said end portions having notch means including a notch cut through the full axial extent of said one end portion into a said slot near said one pillar member for facilitating deformation of a region of said one end portion near said one pillar member and thereby reducing stress concentration in said one pillar member.

5. A retainer according to claim 4, wherein said notch means includes a pair of said notches, and wherein between each pair of pillar members that is circumferentially adjacent to said one pillar member a respective one of said pair of notches is formed.

* * * * *